United States Patent
Liao

(10) Patent No.: US 9,724,902 B2
(45) Date of Patent: Aug. 8, 2017

(54) AIR-SEALED BODY CAPABLE OF AUTOMATICALLY OPENING AIR VALVE

(71) Applicant: AIR-BAG PACKING CO., LTD., Sindian, Taipei County (TW)

(72) Inventor: Yao-Sin Liao, Sindian (TW)

(73) Assignee: AIR-BAG PACKING CO., LTD., Sindian, Taipei County (TW)

( * ) Notice: Subject to any disclaimer, the term of this patent is extended or adjusted under 35 U.S.C. 154(b) by 13 days.

(21) Appl. No.: 14/683,714

(22) Filed: Apr. 10, 2015

(65) Prior Publication Data

US 2015/0210050 A1 Jul. 30, 2015

Related U.S. Application Data

(63) Continuation-in-part of application No. 12/626,419, filed on Nov. 25, 2009, now abandoned.

(30) Foreign Application Priority Data

Nov. 28, 2008 (TW) .............................. 97146406 A

(51) Int. Cl.
  *B65D 30/24* (2006.01)
  *B65D 81/03* (2006.01)
  (Continued)

(52) U.S. Cl.
  CPC ............ *B32B 37/0076* (2013.01); *B32B 7/04* (2013.01); *B32B 37/06* (2013.01);
  (Continued)

(58) Field of Classification Search
  CPC .... B65D 31/14; B65D 31/145; B65D 31/147; B65D 81/03; B65D 81/052
  See application file for complete search history.

(56) References Cited

U.S. PATENT DOCUMENTS 3,806,025 A   4/1974   Marshall
6,276,532 B1  8/2001   Sperry et al.
(Continued)

FOREIGN PATENT DOCUMENTS

JP   5-095851 U      12/1993
JP   2005-162268 A   6/2005
TW   587049          5/2004

OTHER PUBLICATIONS

JP2005162268Translation.*

*Primary Examiner* — Jes F Pascua
*Assistant Examiner* — Nina Attel
(74) *Attorney, Agent, or Firm* — Muncy, Geissler, Olds & Lowe, P.C.

(57) ABSTRACT

An air-sealed body capable of automatically opening an air valve is provided. First, the two inner films are laminated between two outer films. An air passage and a plurality of air columns are formed through joining by means of heat-sealing. Air inlets are formed by heat-sealing in the two inner films at the places where the heat-resisting material is coated, and a plurality of heat-sealed blocks are formed through joining by means of heat-sealing at the sides of the air inlets. When air is filled in, the two outer films of the air passage are pulled open outward in a longitudinal direction, the air passage contracts in a lateral direction due to a drop height of the heat-sealed blocks. The two inner films are squeezed by the heat-sealed blocks to be pulled open outward in the longitudinal direction to open the air inlet.

11 Claims, 8 Drawing Sheets

(51) Int. Cl.
*B32B 37/00* (2006.01)
*B32B 7/04* (2006.01)
*B32B 37/24* (2006.01)
*B32B 37/12* (2006.01)
*B32B 37/06* (2006.01)
*B65D 81/05* (2006.01)
*B32B 38/00* (2006.01)

(52) U.S. Cl.
CPC .......... *B32B 37/1284* (2013.01); *B32B 37/24* (2013.01); *B65D 31/14* (2013.01); *B65D 81/052* (2013.01); *B32B 2037/243* (2013.01); *B32B 2038/0052* (2013.01); *B32B 2255/00* (2013.01); *B32B 2307/30* (2013.01); *B32B 2439/00* (2013.01); *Y10T 428/24744* (2015.01)

(56) References Cited

U.S. PATENT DOCUMENTS

| | | | |
|---|---|---|---|
| 8,205,750 B2* | 6/2012 | Kim | B65D 81/052 |
| | | | 206/522 |
| 8,701,888 B2* | 4/2014 | Liao | B65D 31/145 |
| | | | 206/522 |
| 2007/0267094 A1 | 11/2007 | Liao et al. | |
| 2010/0239189 A1 | 9/2010 | Kim | |

* cited by examiner

AIR-SEALED BODY CAPABLE OF AUTOMATICALLY OPENING AIR VALVE

CROSS-REFERENCE TO RELATED APPLICATION

This application is a continuation-in-part of U.S. patent application Ser. No. 12/626,419 filed Nov. 25, 2009. The above application is incorporated by reference herein.

BACKGROUND OF THE INVENTION

1. Field of the Invention

The present invention relates to an air-sealed body and a method for manufacturing the same, in particular, to an air-sealed body capable of automatically opening an air valve and a method for manufacturing the same.

2. Related Art

An air-sealed body made of a resin film is heat-sealed into a sealed state to form an air column, and provided with an air-filling port for filling air. After air is filled in the air column via the air-filling port, the air-sealed body can be used as a cushioning material in inner packaging.

A conventional air-sealed body is disclosed in Japanese Utility Model Application Laid Open No. 5-95851 entitled "SEALED BAG FOR FLUID". In this utility model, each air column is disposed with a check valve independent of one another, and an inflow port on the top of each check valve is aligned with a heat-sealing line and joined thereto. After air flows into an air passage, the air passage expands to open the check valves, so as to fill the air into the air columns. However, in such a structure, each air column is filled separately as the check valve is independent of one another, and thus it is impossible to fill air into multiple air columns at the same time. Moreover, the manufacturing process is quite complicated, in which each check valve has to be placed at a predetermined position in the air column one by one and then joined thereto through heat-sealing. Once the placing position of the check valve or the joining position of a heat-sealing mold offsets, the check valve may not be fixed in the air column, or the inflow port on the top of the check valve exceeds the heat-sealing line of the heat-sealing mold for joining, which may stop the check valve from being opened with the expansion of the air passage after air is filled in to cause an inflation, thereby preventing the air from entering the air column.

Another air-sealed body is disclosed in Taiwan Patent No. 00587049. In this patent, whether air is allowed to enter a sealed body or not is controlled through a passage of an open/close valve formed by joining two inner films to an outer film on one side. After air is filled in, the sealed body expands to block the passage. This open/close valve described herein only functions to block the air in the sealed body from leaking. However, when the air passage expands after air is filled in, even if the two outer films are pulled open outward under the thrust of the air, the open/close valve may not be pulled open outward with the motion of the two outer films, and the two inner films of the open/close valve still attach to each other so that the air passage inlet cannot be opened. According to this design, air cannot be automatically filled in the sealed body.

Therefore, it is a technical problem to be solved by the inventor of the present invention and those engaged in the related art to design a sealed body, which is capable of automatically opening its air inlet to fill in air continuously so as to save the air-filling time, and also capable of automatically closing the air when air is filled in and automatically locking the air after the air closure, thus preventing the air from leaking for a long time and simplifying the manufacturing process to improve the yield.

SUMMARY OF THE INVENTION

Accordingly, the present invention is directed to an air-sealed body capable of automatically opening an air valve. The sealed body comprises two outer films, laminated on top of each other; two inner films, disposed between the two outer films, and each including a first side and a second side opposite to each other; a plurality of heat-resisting materials, coated between the first sides of the two inner films; an air passage, being a space formed by joining the two outer films by means of heat-sealing, and including an air-filling port for filling air; a plurality of air columns, being spaces capable of storing air and formed by joining the two outer films by means of heat-sealing; a plurality of air inlets, formed in the two inner films at the places where the heat-resisting materials are coated by joining the two outer films to the two inner films by means of heat-sealing, so as to communicate the air passage with the plurality of air columns; and a plurality of heat-sealed blocks, formed at the sides of the air inlets by joining the two outer films to the two inner films by means of heat-sealing. After the air is filled in via the air-filling port to expand the air passage, the two outer films are pulled open outward in a longitudinal direction. Meanwhile, as no heat-sealed area in a lateral direction expands with the filling of the air, and the heat-sealed blocks also do not expand due to the filling of the air, a drop height of the blocks is produced, and the two outer films are thus squeezed and contracted in the lateral direction. Thereby, the places on the two inner films where the heat-resisting material is coated are pulled open outward, i.e., the two inner films are pulled open outward in the longitudinal direction to open the air inlets. As such, the air presses against the second sides of the two inner films to close the air columns after entering the air columns.

The present invention is also directed to a method for manufacturing an air-sealed body capable of automatically opening an air valve. The method includes the following steps. Two inner films are provided, each including a first side and a second side opposite to each other. At least one heat-resisting material is coated between the first sides of the two inner films. Two outer films are laminated to make the two inner films located between the two outer films. The two outer films are joined by means of heat-sealing, so as to form an air passage and a plurality of air columns between the two outer films. The two outer films are joined to the two inner films by means of heat-sealing, so as to form a plurality of air inlets in the two inner films at the places where the heat-resisting material is coated, thereby communicating the air passage with the air columns. The two outer films are joined to the two inner films by means of heat-sealing, so as to form a plurality of heat-sealed blocks at the sides of the air inlets. When air is filled to expand the air passage, as the heat-sealed blocks are provided in advance by means of heat-sealing at predetermined positions on the two outer films of the air passage, the portions of the air passage where the heat-sealed blocks are provided may not expand, while the portions where the heat-sealed blocks are not provided may expand, thus resulting in a drop height, i.e., the two outer films are pulled open outward at the places where the heat-sealed blocks are not provided in a longitudinal direction, and contract at the places where the heat-sealed blocks are provided in a lateral direction. The two inner films are squeezed with the heat-sealed blocks, so as to make the places where the heat-sealed blocks are not provided in the longitudinal direction pulled open outward, such that the air inlets are open, and the air is filled in the air columns. Finally, the second sides of the two inner films are pressed by the air in the air columns to close the air columns.

In one aspect of the present invention, the heat-sealed blocks are formed in advance by means of heat-sealing at predetermined positions on the air passage. When air is filled in to expand the air passage, the two outer films are pulled open outward under the thrust of the air. As a drop height is produced due to the existence and non-existence of the heat-sealed blocks when air is filled in, the two outer films are pulled open outward in the longitudinal direction and contract in the lateral direction due to the filling of the air. The two inner films are squeezed with the heat-sealed blocks when the two outer films contract in the lateral direction, thus making the two inner films contract under squeezing at the places where the heat-resisting material is coated in the longitudinal direction. In this manner, the air inlets are open, and the air in the air passage is filled into each air column through the air inlets.

DESCRIPTION OF THE PREFERRED EMBODIMENTS

Referring to FIGS. 1, 2A, 2B, 3, 4A, 4B, and 5, a first embodiment of an air-sealed body capable of automatically opening an air valve is provided.

Figure 1:
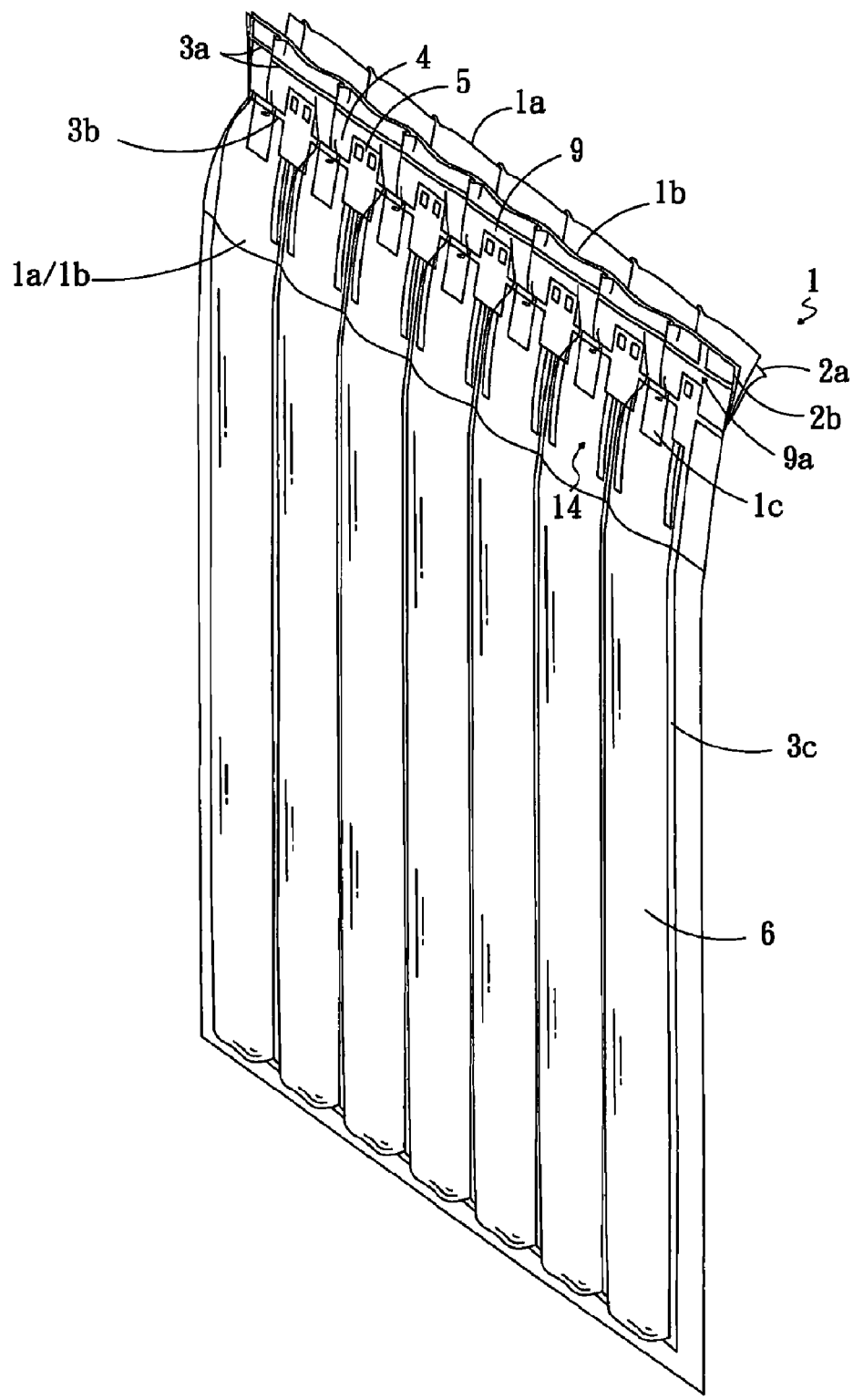
FIG. 1 is a schematic three-dimensional view of a first embodiment of the present invention after air-filling.
Figure 2A:
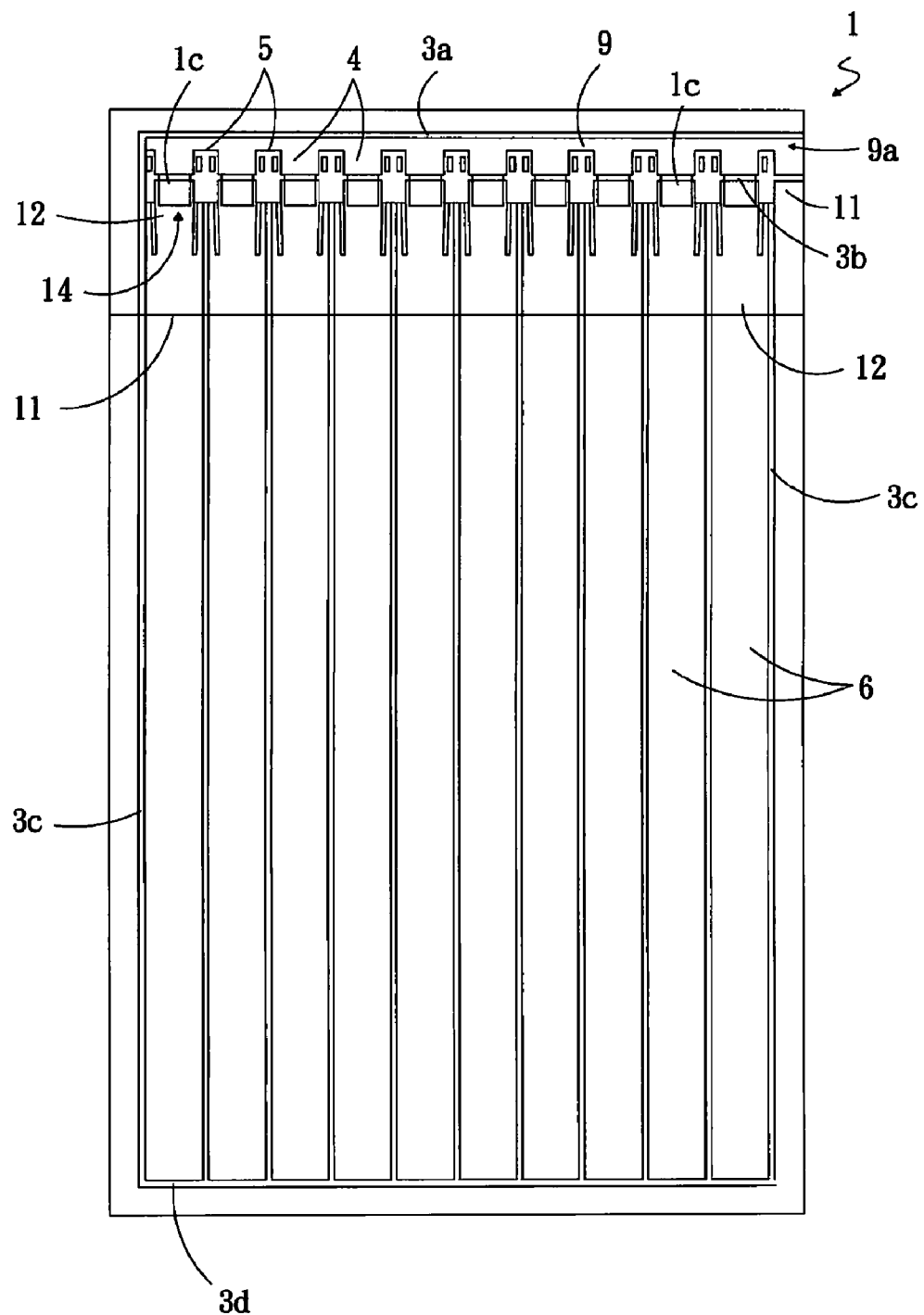
FIG. 2A is a plane view (I) of the first embodiment of the present invention before air-filling.
Figure 2B:
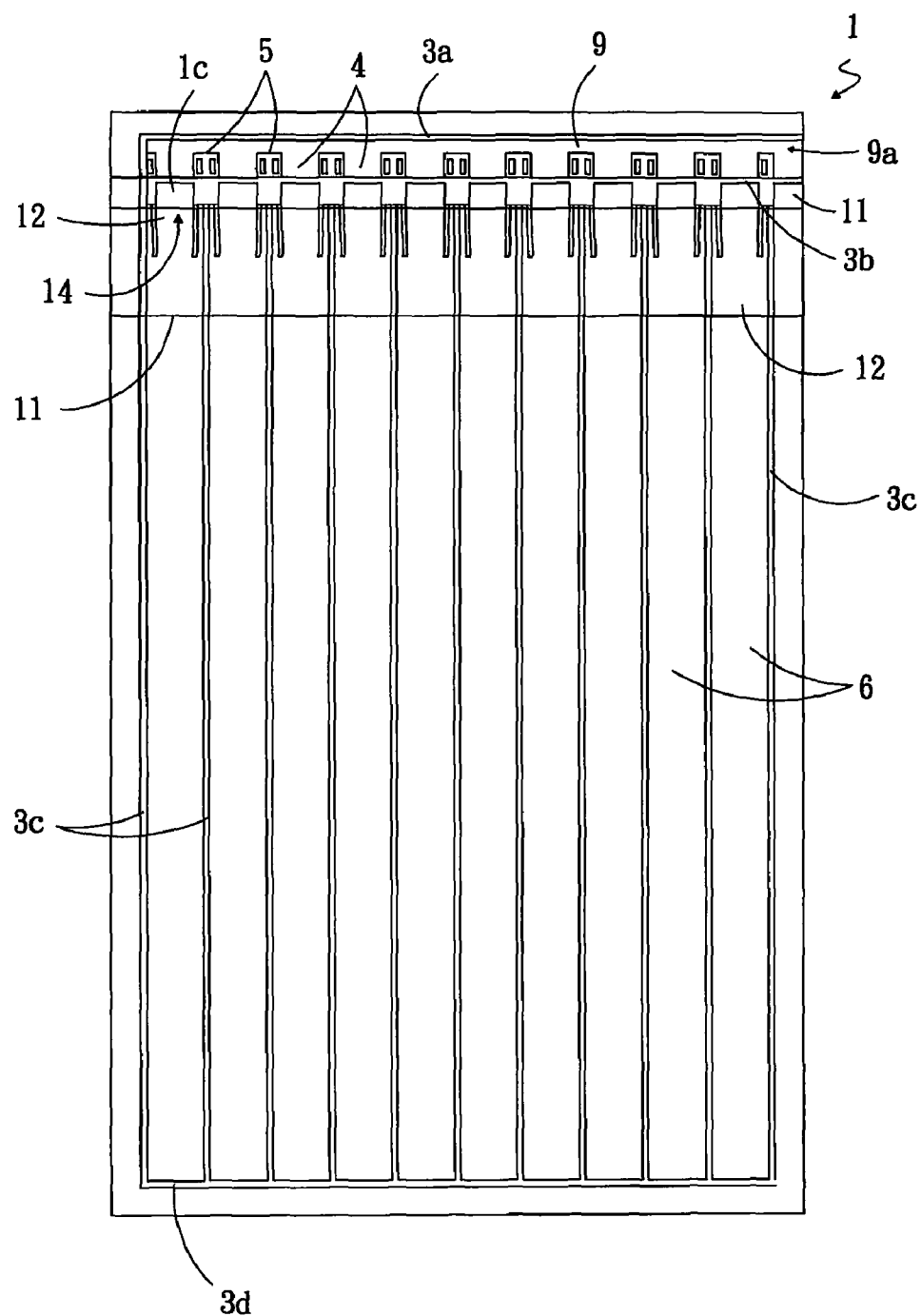
FIG. 2B is a plane view (II) of the first embodiment of the present invention before air-filling.
Figure 3:
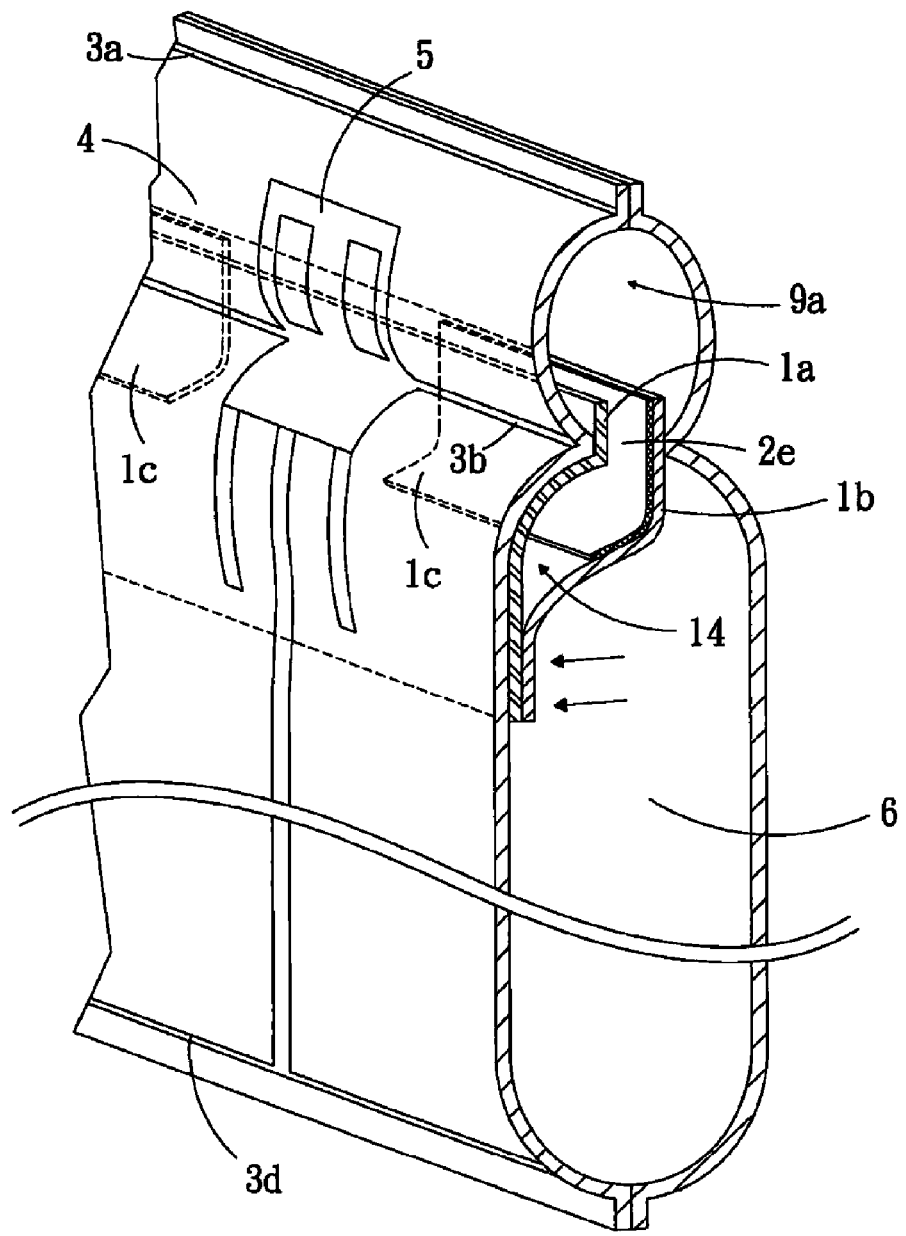
FIG. 3 is a cross-sectional view of the first embodiment of the present invention after air-filling.

The air-sealed body capable of automatically opening an air valve 1 of the present invention comprises two outer films 2a and 2b, two inner films 1a and 1b, a plurality of heat-resisting materials 1c, an air passage 9, a plurality of air columns 6, and a plurality of heat-sealed blocks 5. The two outer films 2a and 2b are laminated on top of each other. The two inner films 1a and 1b are located between the two outer films 2a and 2b at positions slightly below the inner top of the two outer films 2a and 2b. The width of the two inner films 1a and 1b is the same as that of the two outer films 2a and 2b, and the length thereof is smaller than that of the outer films 2a and 2b. Each inner film has a first side 11 and a second side 12 opposite to each other. In addition, the plurality of heat-resisting materials 1c are coated between the first sides 11 of the two inner films 1a and 1b at intervals (as shown in FIG. 2A), so as to form an air flowing passage. Alternatively, in the present invention, a strip-shaped heat-resisting material 1c may also be coated between the two inner films 1a and 1b at a length equal to that of the first side 11 (as shown in FIG. 2B).

Heat-sealing is carried out along a top heat-sealing line 3a, a first heat-sealing line 3b to join the two outer films 2a and 2b to the two inner films 1a and 1b, so as to form the air passage 9 that air can pass through at the two outer films 2a and 2b, and form an air-filling port 9a at one end of the air passage 9. Heat-sealing is carried out along a plurality of second heat-sealing lines 3c and a bottom heat-sealing line 3d to join the two outer films 2a and 2b, so as to form the air columns 6 between the two outer films 2a and 2b. After the heat-resisting materials 1c are coated between the two inner films 1a and 1b at intervals, a plurality of air inlets 2e are formed at places corresponding to the first heat-sealing line 3b through joining by means of heat-sealing, and each air inlet 2e is corresponding to one air column 6, such that a continuous air valve capable of simultaneously filling air into multiple air columns 6 is formed by the two inner films 1a and 1b.

Subsequently, the two outer films 2a and 2b are joined to the two inner films 1a and 1b by means of heat-sealing, and a plurality of heat-sealed blocks 5 are formed at predetermined positions at the sides of the air inlets 2e. Here, each heat-sealed block 5 is roughly strip-shaped, with one portion located in the air passage 9 and the other portion located in the air column 6 (as shown in FIG. 2A). Further, an air-leading passage 4 is formed between two adjacent heat-sealed blocks 5, and is located between the two inner films 1a and 1b and connected to the air inlets 2e. In whole, the two adjacent heat-sealed blocks 5 are roughly in the shape of peaks, and the air-leading passages 4 are roughly in the shape of valleys.

Figure 4A:
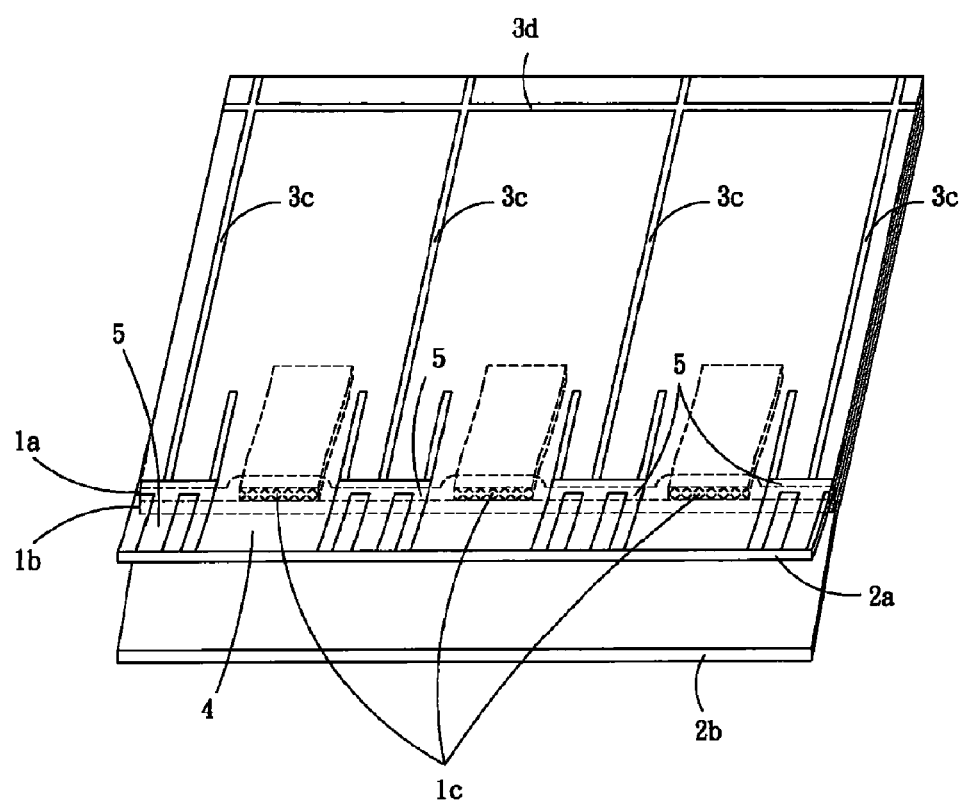
FIG. 4A is a cross-sectional view from another angle of view of the first embodiment of the present invention before air-filling.
Figure 4B:
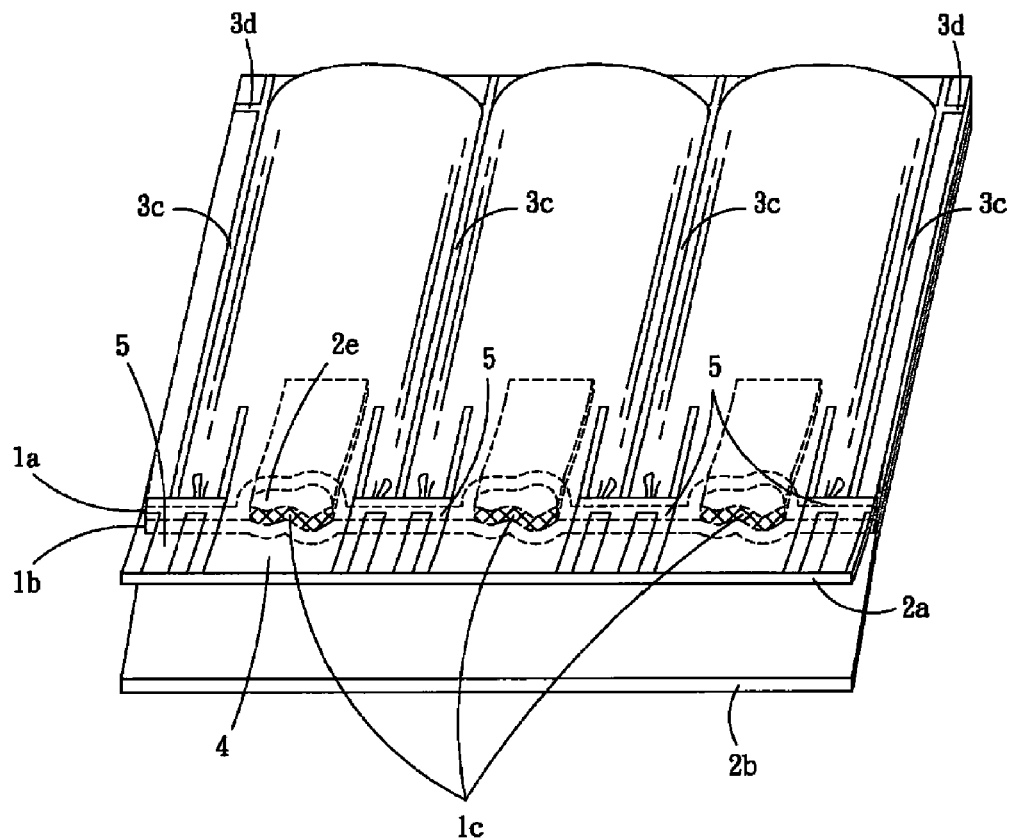
FIG. 4B is a cross-sectional view from another angle of view of the first embodiment of the present invention after air-filling.

After the air is filled in via the air-filling port 9a to expand the air passage 9, the two outer films 2a and 2b are pulled open outward in a longitudinal direction. As the two outer films 2a and 2b expand into a stereo shape with an arc from a planar shape, the places where the heat-sealed blocks 5 are not provided may expand due to air-filling, and the places where the heat-sealed blocks are provided may not expand due to air-filling, the air passage 9 contracts in a lateral direction due to a drop height produced during air-filling, and the two outer films 2a and 2b that form the air passage 9 contract to make displacement in the lateral direction, so as to squeeze the two inner films 1a and 1b with the heat-sealed blocks 5, such that the two inner films 1a and 1b are pulled open outward in the longitudinal direction and the air inlets 2e are open automatically (as shown in FIGS. 4A and 4B). That is, the heat-sealed blocks 5 roughly in the shape of peaks squeeze toward the air-leading passages 4 in the shape of valleys, and thus the two inner films 1a and 1b of the air-leading passages 4 are pulled open outward, so that a notch formed by pre-coating the two inner films 1a and 1b with the heat-resisting material 1c and then performing heat-sealing thereon is squeezed open.

As the air inlets 2e are opened automatically, the air columns 6 can be filled simultaneously through one air passage 9 with no need to position the air inlets 2e in advance, thus saving the air-filling time. As the air columns 6 are independent of each other, the entire cushioning effect of the air-sealed body may not be affected even when some of the air columns 6 are damaged.

After the air is filled into the air columns 6 via the air-leading passages 4 and the air inlets 2e, an inner pressure of the air in the air columns 6 is exerted on the second sides 12 of the two inner films 1a and 1b, so as to force the two inner films 1a and 1b to attach together to close the air columns 6, thereby preventing the air from leaking and achieving an effect of air closure. Here, the two inner films 1a and 1b suspend in the air columns 6 under the air pressure, or the two inner films 1a and 1b are joined to one of the outer films 2a and 2b, and the air presses against the two inner films 1a and 1b to attach to the outer film 2a or 2b after entering the air columns 6 so as to close the air columns 6.

Figure 5:
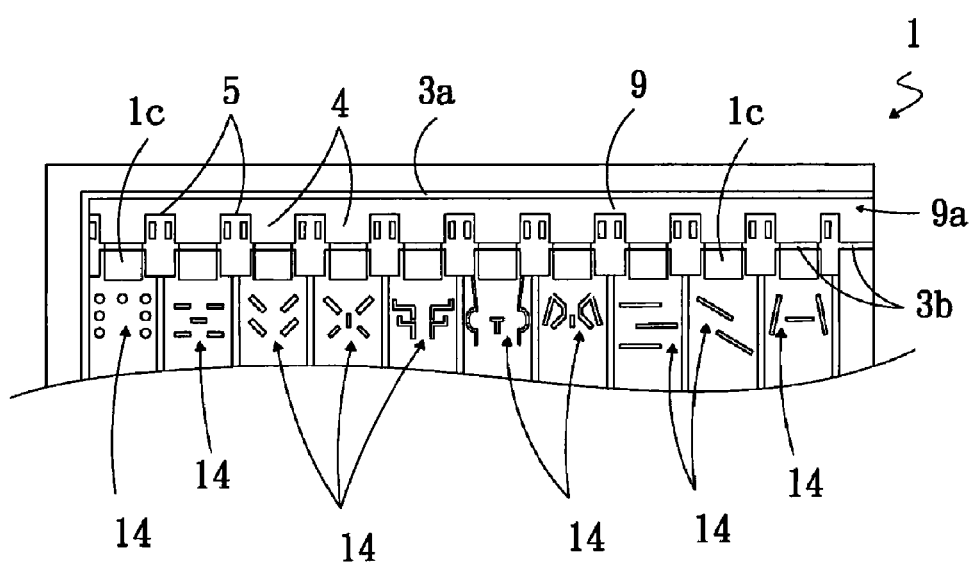
FIG. 5 is a schematic view of the first embodiment of the present invention, in which different air passages are provided.

In addition, before laminating the two inner films 1a and 1b between the two outer films 2a and 2b, air passages 14 can be formed at the two inner films 1a and 1b by means of heat-sealing. The air passages 14 are connected to the air inlets 2e. The width of one end of the air passage 14 connected to the air inlets 2e is larger than that of the other end, such that the air in the air inlets 2e may be easily filled in and difficult to escape. Here, the air passages 14 are gradually decreased from the air inlets 2e. An air locking effect is achieved when the air columns 6 under an increasing inner pressure press against the curved portions of the air passages 14. The air passage 14 of the present invention is not limited to a curved shape, but may also be in the shape of mesh points or in other curved shapes (as shown in FIG. 5), or the structure thereof may vary upon actual design requirements. Further, a plurality of air passages 14 of the same structure, or a plurality of air passages 14 of different structures may be disposed between the two inner films 1a and 1b.

Figure 6A:
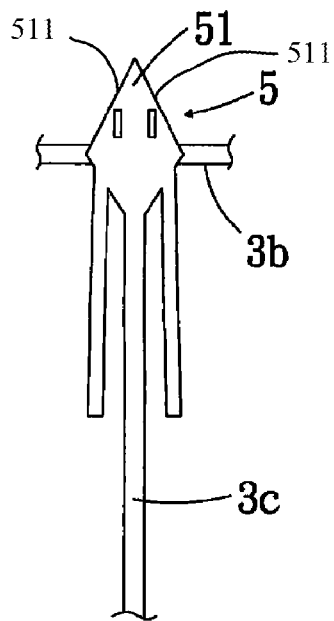
FIG. 6A is a schematic view (I) of a heat-sealed block according to a second embodiment of the present invention.
Figure 6B:
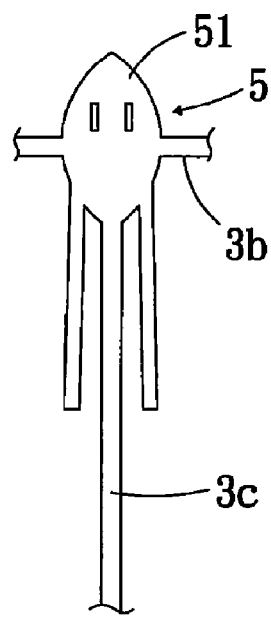
FIG. 6B is a schematic view (II) of the heat-sealed block according to the second embodiment of the present invention.
Figure 7:
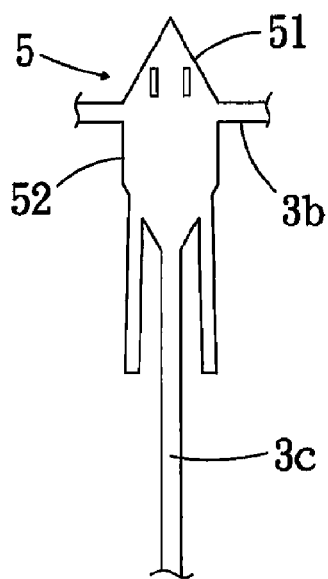
FIG. 7 is a schematic view of a heat-sealed block according to a third embodiment of the present invention.

Referring to FIGS. 6A, 6B and 7 showing preferable embodiments of the heat-sealed block 5, each of the heat-sealed blocks 5 is provided with an enlarged air-guiding portion 51 and a positioning portion 52. The air-guiding portion 51 has a planar surface or cambered surface gradually enlarged form a top end (close to the heat-sealing line 3a) to a bottom end (close to the heat-sealing line 3b), and is disposed in the air passage 9. More specifically, the enlarged air-guiding portion 51 is located at the air passage 9 and has two opposite guiding sides 511 (as shown in FIG. 6A) for guiding the air in the air passage 9 into the air inlet 2e, and each of the guiding sides 511 is inclined from the first heat-sealing line 3b to a top of the air-guiding portion 51 and intersects with each other such that an upper part of the air-guiding portion 51 is narrower than a lower part of the air-guiding portion 51. After the air is filled in via the air-filling port 9a to expand the air passage 9, the air within the air passage 9 is guided by the air-guiding sides 511 of the air-guiding portion 51 to the air-leading passages 4 and the air inlets 2e, thus greatly enhancing the air-filling efficiency, and preventing air vortexes from being generated by the flowing air in the air passage 9.

The positioning portion 52 is joined to the first sides 11 of the two inner films 1a and 1b with the two outer films 2a and 2b, and is integrally formed with the enlarged air-guiding portion 51. The first heat-sealing line 3b cross the juncture of the air-guiding portion 51 and the positioning portion 52 to make the air inlet 2e located at the side of the positioning portion 52. Therefore, during the manufacturing process, even if the two inner films 1a and 1b or the heat-sealing mold offset but not departing from the range of the positioning portion 52, the two inner films 1a and 1b may also be joined to the two outer films 2a and 2b by means of heat-sealing along the first heat-sealing line 3b without affecting the structure and air-filling function of the air inlets 2e. In this manner, the problem that the conventional sealed body cannot fill in air after heat-sealing due to the offset of the air valve is avoided.

Furthermore, in the present invention, the first sides 11 of the two inner films 1a and 1b may also be joined to the two outer films 2a and 2b through the air-guiding portion 51, and the first heat-sealing line 3b is located in the air-guiding portion 51 instead of at the top of the air-guiding portion 51, so that the air inlet 2e is located at the side of the air-guiding portion 51.

Each air column 6 may be connected to one or more air inlets 2e, and each air inlet 2e may be further connected to one or more air passages 14. The air columns 6 are communicated with each other, and may share one or more air passages 14.

A method for manufacturing an air-sealed body capable of automatically opening an air valve includes the following steps. In Step 101, two inner films 1a and 1b are provided, each including a first side 11 and a second side 12 opposite to each other. In this step, an air passage 14 may be formed in advance at the two inner films 1a and 1b through joining by means of heat-sealing. In Step 102, a plurality of heat-resisting materials 1c are coated between the first sides 11 of the two inner films 1a and 1b. The heat-resisting materials 1c are coated between the first sides 11 of the two inner films 1a and 1b at intervals, so as to form an air flowing passage, or a strip-shaped heat-resisting material 1c is coated between the two inner films 1a and 1b at a length equal to that of the first side 11.

In Step 103, the two outer films 2a and 2b are laminated to make the two inner films 1a and 1b located between the two outer films 2a and 2b. The two inner films 1a and 1b are located between the two outer films 2a and 2b at positions slightly below the inner top of the two outer films 2a and 2b. In Step 104, the two outer films 2a and 2b are joined by means of heat-sealing to form an air passage 9 and a plurality of air columns 6 between the two outer films 2a and 2b. Heat-sealing is carried out along heat-sealing lines 3a, 3b to join the two outer films 2a and 2b to the two inner films 1a and 1b, so as to form an air passage 9 that air can pass through at the two outer films 2a and 2b, and form an air-filling port 9a at one end of the air passage 9. Heat-sealing is carried out along the second heat-sealing lines 3c, and the bottom heat-sealing line 3d by means of heat-sealing to join the two outer films 2a and 2b, so as to form a plurality of air columns 6 between the two outer films 2a and 2b. In Step 105, the two outer films 2a and 2b are joined to the two inner films 1a and 1b by means of heat-sealing to form a plurality of air inlets 2e on the two inner films 1a and 1b at the places where heat-resisting materials 1c are coated, so as to communicate the air passage 9 with the plurality of air columns 6.

After the heat-resisting materials 1c are coated between the two inner films 1a and 1b, a plurality of air inlets 2e are formed at the top heat-sealing line 3a through joining by means of heat-sealing, each air inlet 2e is corresponding to one air columns 6, and the air inlets 2e may be connected to the air passage 14, so that a continuous air valve capable of simultaneously filling air into multiple air columns 6 is formed by the two inner films 1a and 1b. In Step 106, the two outer films 2a and 2b are joined to the two inner films 1a and 1b by means of heat-sealing, so as to form a plurality of heat-sealed blocks 5 at the sides of the air inlets 2e.

The two outer films 2a and 2b are joined to the two inner films 1a and 1b by means of heat-sealing, and a plurality of heat-sealed blocks 5 are formed at predetermined positions on the sides of the air inlets 2e. Here, each heat-sealed block 5 has one portion located in the air passage 9 and the other portion located in the air column 6. Further, an air-leading passage 4 is formed between two adjacent heat-sealed blocks 5, and is located between the two inner films 1a and 1b and connected to the air inlets 2e. In whole, the two adjacent heat-sealed blocks 5 are roughly in the shape of peaks, and the air-leading passages 4 are roughly in the shape of valleys for facilitating air flow from the air inlets 24 into the air columns 6.

More specifically, each heat-sealed block 5 is provided with an air-guiding portion 51 and a positioning portion 52. The air-guiding portion 51 is located in the air passage 9 and has two opposite guiding sides 511 for guiding the air in the air passage into the air inlet 2e, wherein each of the guiding sides 511 is inclined from the first heat-sealing line 3b to a top of the air-guiding portion 51 and intersects with each other such that an upper part of the air-guiding portion 51 is narrower than a lower part of the air-guiding portion 51. The positioning portion 52 is integrally formed with a bottom end of the air-guiding portion 51, and is located at the air columns 6 for further joining the first sides of the two inner films 1a and 1b with the two outer films 2a and 2b. Here, the air-guiding portion 51 is used for guiding the air in the air passage 9 into the air-leading passage 4 and the air inlets 2e, the positioning portion 52 is used for joining the first sides 11 of the two inner films 1a and 1b to the two outer films 2a and 2b. The first heat-sealing line 3b is disposed in the positioning portion 52 to make the air inlet 2e located at the side of the positioning portion 52. Further, in the present invention, the first sides 11 of the two inner films 1a and 1b may also be joined to the two outer films 2a and 2b through the air-guiding portion 51, and the first heat-sealing line 3b is located in the air-guiding portion 51 instead of at the top of the air-guiding portion 51, so that the air inlet 2e is located at the side of the air-guiding portion 51.

In Step 107, air is filled in to expand the air passage 9, so as to make the two outer films 2a and 2b pulled open outward in a longitudinal direction and contract in a lateral direction. After the air is filled in via the air-filling port 9a to expand the air passage 9, the two outer films 2a and 2b are pulled open outward in the longitudinal direction, and contract in the lateral direction as they expand into a stereo shape with an arc from a planar shape. In Step 108, the two inner films 1a and 1b are squeezed by the heat-sealed blocks 5 to be pulled open outward in the longitudinal direction, so as to open the air inlets 2e and fill air into the air columns 6.

As the heat-sealed blocks 5 are formed in advance by means of heat-sealing at predetermined positions on the two outer films 2a and 2b of the air passage 9, when air is filled in, the portions of the air passage 9 where the heat-sealed blocks 5 are provided may not expand, while the portions where the heat-sealed blocks 5 are not provided may expand, so that the two outer films 2a and 2b contract in the lateral direction due to a drop height, and thus the heat-sealed blocks 5 make displacement in the lateral direction with the contraction of the two outer films 2a and 2b. That is, the heat-sealed blocks 5 roughly in the shape of peaks squeeze toward the air-leading passages 4 in the shape of valleys, and thus the two inner films 1a and 1b of the air-leading passages 4 are pulled open outward, so that the places on the two inner films 1a and 1b where the heat-resisting materials 1c coated are squeezed to be pulled open outward in the longitudinal direction and thus open the air inlets 2e. In other words, a notch formed by pre-coating the two inner films 1a and 1b with the heat-resisting material 1c and then performing heat-sealing thereon is squeezed open. After the air inlets 2e are open, air flows into the air columns 6 along the air passage 14 after entering the air inlets 2e, and air locking is carried out by the air passage 14 to avoid air backflow, thereby enabling one air passage 9 to fill air into multiple air columns 6 at the same time.

In Step 109, the second sides 12 of the two inner films 1a and 1b are pressed by the air in the air columns 6 to close the air columns 6. An inner pressure of the air in the air columns 6 is exerted on the second sides 12 of the two inner films 1a and 1b, so as to force the two inner films 1a and 1b to attach together to close the air columns 6, thereby preventing the air from leaking and achieving an effect of air closure. Here, the two inner films 1a and 1b suspend in the air columns 6 under the air pressure, or the two inner films 1a and 1b are joined to one of the outer films 2a or 2b, and the air presses against the two inner films 1a and 1b to attach to the outer film 2a or 2b after entering the air columns 6 so as to close the air columns 6.

In the present invention, when air is filled in, the two outer films 2a and 2b are pulled open outward under the thrust of the air, so that the two outer films 2a and 2b are pulled open outward in the longitudinal direction and contract in the lateral direction, and meanwhile the two inner films 1a and 1b are squeezed by the heat-sealed blocks 5, such that the two inner films 1a and 1b automatically open the air inlets 2e under the squeeze in the longitudinal direction, and thus the air in the air passage is filled into each air column via the air inlets. Further, in the present invention, the first sides of the two inner films 1a and 1b are joined to the two outer films 2a and 2b through the heat-sealed blocks 5, so that even if the two inner films 1a and 1b or the heat-sealing mold offset but not departing from the range of the heat-sealed blocks 5, the two inner films 1a and 1b may also be joined to the two outer films 2a and 2b by means of heat-sealing along the first heat-sealing line 3b without affecting the structure and air-filling function of the air inlets. In this manner, the problem that the conventional sealed body cannot fill in air after heat-sealing due to the offset of the air valve is avoided.

It is understood that the invention may be embodied in other forms within the scope of the claims. Thus the present examples and embodiments are to be considered in all respects as illustrative, and not restrictive, of the invention defined by the claims.

What is claimed is:

1. An air-sealed body capable of automatically opening an air valve, comprising:
   two outer films, laminated on top of each other;
   two inner films, disposed between the two outer films, and each comprising a first side and a second side opposite to each other;
   a plurality of heat-resisting materials, coated between the first sides of the two inner films at intervals;
   an air passage, being a space formed by joining the two outer films by means of heat-sealing, and comprising an air-filling port for filling air, and the first sides of the two inner films being located in the air passage;
   a plurality of air columns, being spaces capable of storing air and formed by joining the two outer films by means of heat-sealing;
   a first heat-sealing line, formed by joining the two outer films and the two inner films by means of heat-sealing to divide into the air passage and the air columns;
   a plurality of second heat-sealing lines, intersected in the first heat-sealing line and formed by joining the two outer films and the two inner films by means of heat-sealing to divide into the air columns;

a plurality of air inlets, formed between the two inner films at the places where the first heat-sealing line overlaps the heat-resisting material so as to communicate the air passage with the plurality of air columns;

a plurality of heat-sealed blocks, formed at the places where the second heat-sealing lines intersected in the first heat-sealing line and at the sides of the air inlets by joining the two outer films to the two inner films by means of heat-sealing, each of the heat-sealed blocks comprising at least one enlarged air-guiding portion and a positioning portion, wherein the at least one enlarged air-guiding portion is located at the air passage at a position above the first heat-sealing line and having two opposite guiding sides for guiding the air in the air passage into the air inlet, each of the guiding sides being inclined from the first heat-sealing line to a top of the air-guiding portion and intersecting with each other such that an upper part of the air-guiding portion is narrower than a lower part of the air-guiding portion, and wherein the positioning portion is located at the air columns at a position below the first heat-sealing line for joining the first sides of the two inner films with the two outer films, the positioning portion having a first guiding side and a second guiding side located on opposing sides of a respective one of the second heat-sealing lines, each of the first and second guiding sides being inclined from the first heat-sealing line to a point at which each of the first and second guiding sides connects with the respective one of the second heat-sealing lines, the positioning portion extending continuously from the first guiding side to the second guiding side, such that the first sides of the two inner films are joined to the two outer films by a heat seal that extends continuously across the positioning portion from the first guiding side to the second guiding side, and the positioning portion including an additional heat-sealing line extending from each of the first and second guiding sides, respectively, wherein each additional heat-sealing line, along an entire length thereof, heat seals the first sides of the two inner films to the two outer films; and an air-leading passage formed between two adjacent of the plurality of heat-sealed blocks and connecting the air inlets;

wherein after the air is filled in via the air-filling port to expand the air passage, the two outer films are pulled open outward in a longitudinal direction and contract in a lateral direction, the two inner films are squeezed with the heat-sealed blocks so as to make the places on the two inner films where the heat-resisting material is coated pulled open outward in the longitudinal direction and open the air inlets, and the air presses against the second sides of the two inner films to close the air columns after entering the air columns.

2. The air-sealed body capable of automatically opening an air valve of claim 1, wherein the positioning portion is integrally formed with the air-guiding portion, and the air inlets are located at sides of the positioning portion.

3. The air-sealed body capable of automatically opening an air valve of claim 2, wherein the positioning portion joins the first sides of the two inner films and the two outer films.

4. The air-sealed body capable of automatically opening an air valve of claim 2, wherein the at least one air-guiding portion joins the first sides of the two inner films and the two outer films.

5. The air-sealed body capable of automatically opening an air valve of claim 1, further comprising: a plurality of air passages connected to the air inlets, wherein the air passages are spaces formed by joining the two inner films by means of heat-sealing.

6. A method for manufacturing an air-sealed body capable of automatically opening an air valve, comprising:

providing two inner films, each comprising a first side and a second side opposite to each other;

coating a plurality of heat-resisting materials between the first sides of the two inner films at intervals;

laminating two outer films to make the two inner films located between the two outer films;

joining the two outer films by means of heat-sealing to form a first heat-sealing line and a plurality of second heat-sealing lines, so as to form an air passage, at an upper portion of the air valve, and a plurality of air columns between the two outer films, the air passage and the air columns are divided by the first heat-sealing line and the air columns are divided by the second heat-sealing lines, the first sides of the two inner films being located in the air passage;

joining the two outer films to the two inner films by means of heat-sealing, so as to form a plurality of air inlets in the two inner films at the places where the plurality of heat-resisting materials are coated, thereby communicating the air passage with the air columns;

joining the two outer films to the two inner films by means of heat-sealing, so as to form a plurality of heat-sealed blocks at the places where the second heat-sealing lines intersected in the first heat-sealing line at the sides of the air inlets; each of the heat-sealed blocks comprising at least one enlarged air-guiding portion and a positioning portion, wherein the enlarged air-guiding portion is located at the air passage at a position above the first heat-sealing line and having two opposite guiding sides for guiding the air in the air passage into the air inlet, each of the guiding sides being inclined from the first heat-sealing line to a top of the air-guiding portion and intersecting with each other such that an upper part of the air-guiding portion being narrower than a lower part of the air-guiding portion, and wherein the positioning portion is located at the air columns at a position below the first heat-sealing line for joining the first sides of the two inner films with the two outer films, the positioning portion having a first guiding side and a second guiding side located on opposing sides of a respective one of the second heat-sealing lines, each of the first and second guiding sides being inclined from the first heat-sealing line to a point at which each of the first and second guiding sides connects with the respective one of the second heat-sealing lines, the positioning portion extending continuously from the first guiding side to the second guiding side, such that the first sides of the two inner films are joined to the two outer films by a heat seal that extends continuously across the positioning portion from the first guiding side to the second guiding side, and the positioning portion including an additional heat-sealing line extending from each of the first and second guiding sides, respectively, wherein each additional heat-sealing line, along an entire length thereof, heat seals the first sides of the two inner films to the two outer films;

filling air to expand the air passage, so as to make the two outer films pulled open outward in a longitudinal direction and contract in a lateral direction;

squeezing the two inner films with the heat-sealed blocks, so as to pull open outward the places on the two inner films where the heat-resisting material is coated in the longitudinal direction and open the air inlets, such that the air is filled in the air columns; and pressing by the air in the air columns against the second sides of the two inner films to close the air columns.

7. The method for manufacturing an air-sealed body capable of automatically opening an air valve of claim 6, wherein the positioning portion is integrally formed with the air-guiding portion, and the air inlets are located at sides of the positioning portion.

8. The method for manufacturing an air-sealed body capable of automatically opening an air valve of claim 7, wherein the positioning portion joins the first sides of the two inner films and the two outer films.

9. The method for manufacturing an air-sealed body capable of automatically opening an air valve of claim 6, wherein the at least one air-guiding portion joins the first sides of the two inner films and the two outer films.

10. The method for manufacturing an air-sealed body capable of automatically opening an air valve of claim 6, wherein an air-leading passage is formed between two of the plurality of heat-sealed blocks.

11. The method for manufacturing an air-sealed body capable of automatically opening an air valve of claim 6, wherein before the step of providing the two inner films, the method further comprises: joining the two inner films by means of heat-sealing, so as to form a plurality of air passages located between the two inner films and connected to the air inlets.

* * * * *